United States Patent [19]

Lew et al.

[11] Patent Number: 5,627,325

[45] Date of Patent: *May 6, 1997

[54] CAPACITIVELY COUPLED OHMIC RESISTANCE POSITION SENSOR

[76] Inventors: Hyok S. Lew; Yon S. Lew, both of 7890 Oak St., Arvada, Colo. 80005

[*] Notice: The term of this patent shall not extend beyond the expiration date of Pat. No. 5,499,544.

[21] Appl. No.: 488,599

[22] Filed: Jun. 8, 1995

Related U.S. Application Data

[63] Continuation of Ser. No. 133,349, Oct. 19, 1993, Pat. No. 5,499,544, which is a continuation-in-part of Ser. No. 36,953, Mar. 25, 1993, Pat. No. 5,347,875.

[51] Int. Cl.$^6$ ............................. G01F 1/22; G01F 23/68
[52] U.S. Cl. ............................. 73/861.56; 340/870.37
[58] Field of Search ............................. 324/661, 662, 324/681, 683; 340/870.37; 73/861.56, 198, 861.53, 861.58, 861.76, 304 C

[56] References Cited

U.S. PATENT DOCUMENTS

| | | | |
|---|---|---|---|
| 2,968,031 | 1/1961 | Higa | 324/683 |
| 3,221,256 | 11/1965 | Walden | 340/870.37 |
| 3,636,449 | 1/1972 | Partridge | 324/157 |
| 4,290,065 | 9/1981 | Gleason | 340/870.37 |
| 4,560,986 | 12/1985 | Lew et al. | 340/870.38 |
| 4,584,885 | 4/1986 | Cadwell | 324/683 |
| 4,641,523 | 2/1987 | Andreasson | 73/313 |
| 4,951,506 | 8/1990 | Lew | 73/314 |

*Primary Examiner*—Richard Chilcot
*Assistant Examiner*—Harshad Patel

[57] ABSTRACT

A position sensor comprises a pair of electrically conducting elongated members having a high ohmic resistance per unit length thereof disposed parallel to one another in a direction defined by the line of displacement of a target member, and a capacitively coupling member disposed adjacent to the pair of electrically conducting elongated members and moving with the target member in the direction of displacement, which capacitively coupling member transmits an alternating electrical signal between the pair of electrically conducting elongated members by a capacitive electrical interaction therebetween, wherein an alternating electrical signal is supplied to the two opposite extremities of one of the pair of electrically conducting elongated members and a phase angle difference between two alternating electrical signals respectively taken off from the two opposite extremities of the other of the pair of electrically conducting elongated members is measured, and the position of the target member is determined as a function of the measured phase angle difference.

20 Claims, 6 Drawing Sheets

CAPACITIVELY COUPLED OHMIC RESISTANCE POSITION SENSOR

This is a Continuation Application to Application Ser. No. 08/133,349 filed on Oct. 8, 1993 now U.S. Pat. No. 5,499,544 that is a Continuation-In-Part Application to Application Ser. No. 08/036,953 filed on Mar. 25, 1993 now U.S. Pat. No. 5,347,875.

FIELD OF INVENTION

This invention relates to a position sensor that measures the linear or rotary position of a target member including an electrically conducting member with a sizable surface area that capacitively couples two electrically conducting elongated members having a high ohmic resistance per unit length thereof, which position sensor has particularly useful applications in the construction of a variable area flowmeter, nonrotating propeller or turbine flowmeter, liquid level sensor, pressure sensor, etc., as well as in determining the position of a mechanical element remotely and automatically.

BACKGROUND OF INVENTION

There has been a great deal of demand for a linear or rotary position sensing apparatus that determines nonintrusively the position of a mechanical target member such as a float floating on the free surface of a liquid medium, a drag body suspended in the stream of a fluid medium, a pointer marking a scale in a dial or bar gauge, a position of a linear or rotary actuator, a nonrotating propeller or turbine experiencing a fluid dynamic torque, etc., which apparatus provides an inexpensive means for automatically or remotely measuring or monitoring the position of the mechanical target with a high degree of resolution and a great deal of accuracy. Unfortunately, such a position sensingapparatus of high performance and low cost is not available at the present time.

BRIEF SUMMARY OF INVENTION

The primary object of the present invention is to provide a linear and angular position sensing apparatus comprising a pair of electrically conducting elongated members of a high specific ohmic resistance disposed in a side-by-side parallel relationship, and a capacitively coupling member made of an electrically conducting material moving with a target member, that capacitively couples the flow of electric current through the pair of electrically conducting elongated members, wherein an alternating electrical signal is supplied to at least one of the two opposite extremities of the first of the pair of electrically conducting elongated members and a phase angle of an alternating electrical signal taken off from one of the two opposite extremities of the second of the pair of electrically conducting elongated members is measured relative to the phase angle of one of the two alternating electrical signals taken off from the other of the two opposite extremities of the second of the pair of electrically conducting elongated members and supplied to the one extremity of the first of the pair of electrically conducting elongated members, respectively, and the position of the target member is determined as a function of the measured phase angle difference.

Another object is to provide the position sensor described in the afore-mentioned primary object of the present invention, wherein the alternating electrical signal is supplied to both of the two opposite extremities of the first of the pair of electrically conducting elongated members, and the phase angle difference between two alternating electrical signals respectively taken off from the two opposite extremities of the second of the pair of electrically conducting elongated members is measured as an electrical variable, from which the position of the target member is determined.

A further object is to provide the position sensor described in the afore-mentioned another object of the present invention, wherein the position sensor includes a second and third pair of electrically conducting elongated members having a construction and function similar to those of the first pair of electrically conducting elongated members, which are disposed in a side-by-side parallel relationship to the first pair of electrically conducting elongated members, and a second capacitively coupling member capacitively coupling the second pair of electrically conducting elongated members to one another fixedly located at one of the two opposite extremities of the combination of the three pairs of electrically conducting elongated members and a third capacitively coupling member capacitively coupling the third pair of electrically conducting elongated members to one another fixedly located at the other of the two opposite extremities of the combination of the three pairs of electrically conducting elongated members; wherein the position of the target member is determined as a function of three phase angle differences respectively obtained from the three pairs of electrically conducting elongated members.

Yet another object is to provide the position sensor described in the afore-mentioned primary object of the present invention, wherein the alternating electrical signal is supplied to only one of the two opposite extremities of the first of the pair of electrically conducting elongated members, and the phase angle difference between the alternating electrical signal supplied to only the one extremity of the first of the pair of electrically conducting elongated members and an alternating electrical signal taken off from one extremity of the second of the pair of electrically conducting elongated members adjacent to the one extremity of the first of the pair of electrically conducting elongated member is measured from which phase angle difference the position of the target member is determined.

Yet a further object is to provide the position sensor described in the afore-mentioned yet another object of the present invention, wherein the the position sensor-includes a second and third pair of electrically conducting elongated members having a construction and function similar to those of the first pair of electrically conducting elongated members disposed in a side-by-side parallel relationship to the first pair of electrically conducting elongated members, and a second capacitively coupling member capacitively coupling the second pair of electrically conducting elongated members to one another fixedly located at one of the two opposite extremities of the combination of the three pairs of electrically conducting elongated members and a third capacitively coupling member coupling the third pair of electrically conducting elongated members to one another fixedly located at the other of the two opposite extremities of the combination of the three pairs of electrically conducting elongated members; wherein the position of the target member is determined as a function of three phase angle differences respectively obtained from the three pairs of electrically conducting elongated members.

Still another object is to provide a linear and rotary position sensing apparatus comprising a single electrically conducting elongated member with a high specific ohmic resistance and a capacitively coupling member moving with a target member in directions parallel to the single electrically conducting elongated member, wherein an alternating electrical signal is supplied to the capacitively coupling member, and a phase angle of an alternating electrical signal taken off from one of the two opposite extremities of the single electrically conducting elongated member is measured relative to the phase angle of one of the two alternating electrical signals taken off from the other of the two opposite extremities of the single electrically conducting elongated member and supplied to the capacitively coupling member, respectively, and the position of the target is determined as a function of the measured phase angle difference.

Still a further object is to provide the position sensor described in the afore-mentioned still another object of the present invention, wherein the phase angle difference between two alternating electrical signals respectively taken off from the two opposite extremities of the single electrically conducting elongated member is measured, from which the position of the target is determined.

Yet still another object is to provide the position sensor described in the aforementioned still a further object of the present invention, wherein the position sensor includes a second and third single electrically conducting elongated member disposed in a side-by-side parallel relationship to the first single electrically conducting elongated member, and a second capacitively coupling member receiving the alternating electrical signal fixedly located at one of the two opposite extremities of the combination of the three single electrically conducting elongated members, which second capacitively coupling member capacitively transmits the alternating electrical signal to the second single electrically conducting elongated member, and a third capacitively coupling member receiving the alternating electrical signal fixedly located at the other of the two opposite extremities of the combination of the three single electrically conducting elongated members, which third capacitively coupling member capacitively transmits the alternating electrical signal to the third single electrically conducting elongated member; wherein the position of the target member is determined as a function of three phase angle differences respectively obtained from the three single electrically conducting elongated members.

Yet still a further object is to provide the position sensor described in the afore-mentioned still another object of the present invention, wherein the phase angle difference between the alternating electrical signal supplied to the capacitively coupling member and an alternating electrical signal taken off from one of the two opposite extremities of the single electrically conducting elongated member is measured, from which the position of the target is determined.

Additionally another object is to provide the position sensor described in the afore-mentioned yet still another object of the present invention, wherein the position sensor includes a second and third single elongated electrically conducting elongated member disposed in a side-by-side parallel relationship to the first single elongated electrically conducting member, and a second capacitively coupling member receiving the alternating electrical signal fixedly located at one of the two opposite extremities of the combination of the three single electrically conducting elongated members, which second capacitively coupling member capacitively transmits the alternating electrical signal to the second single electrically conducting elongated member, and a third capacitively coupling member receiving the alternating electrical signal fixedly located at the other of the two opposite extremities of the combination of the three single electrically conducting elongated members, which third capacitively coupling member capacitively transmits the alternating electrical signal to the third single electrically conducting elongated member; wherein the position of the target member is determined as a function of three phase angle differences respectively obtained from the three single electrically conducting elongated members.

Additionally a further object of the present invention is to provide the position sensors described in the afore-mentioned objects of the present invention, wherein the change of the position of the target is created by a fluid dynamic force exerted on the target member by a flow of fluid media, and the flow rate of fluid media is determined as a function of the position of the target member.

Additionally a further object is to provide the position sensors described in the afore-mentioned objects of the present invention, wherein the target member comprises a float floating at the free surface of a liquid medium, and the position of the liquid level is determined from the position of the target.

Additionally yet another object is to provide the position sensors described in the afore-mentioned objects of the present invention, wherein the target member comprises a mechanical pointer included in a dial or bar gauge such as a mechanical pressure sensor.

BRIEF DESCRIPTION OF FIGURES

The present invention may be described with a greater clarity and specificity by referring to the following figures.

Operating Principles

Figure 1:
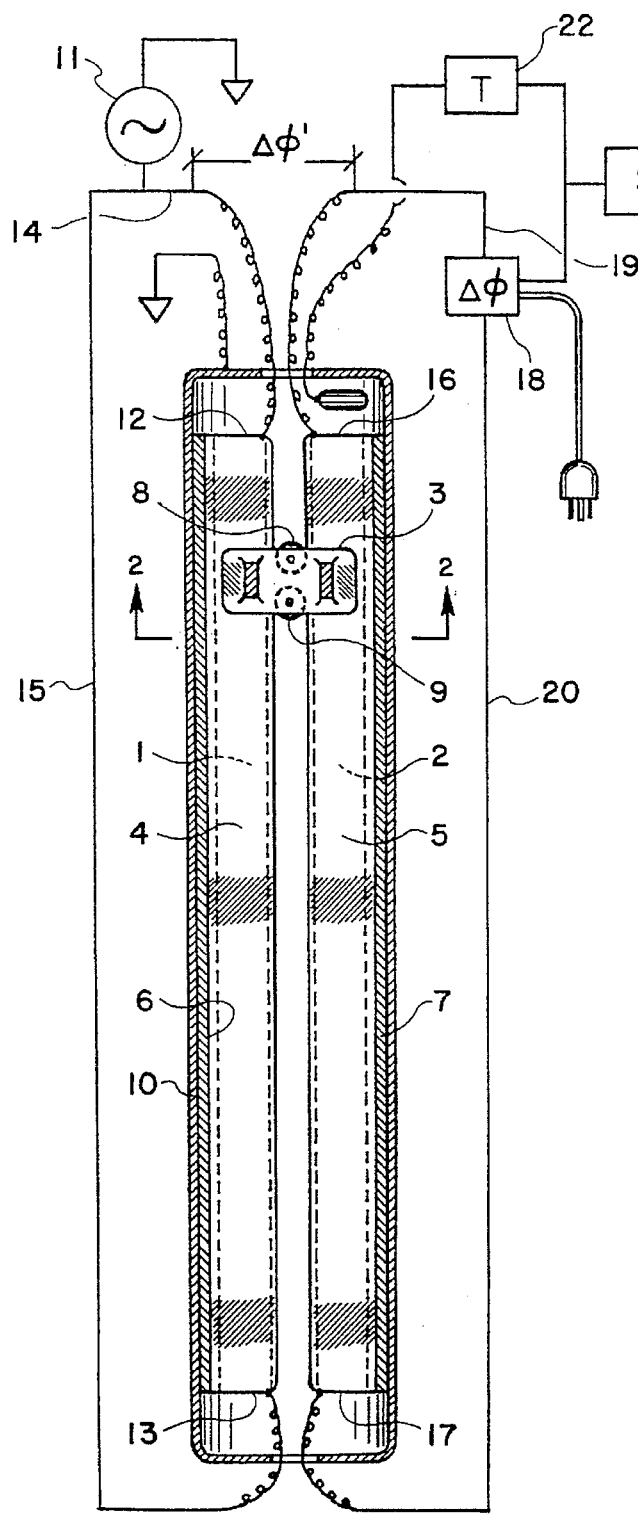
FIG. 1 illustrates an embodiment of the linear position sensor of the present invention comprising a pair of electrically conducting elongated members.

The operating principles of the present invention can be best described by referring to FIG. 1. The pair of electrically conducting elongated members 1 and 2 of a high ohmic resistivity are disposed parallel to one another, and a capacitively coupling member 3 moving with a target member, that is made of an electrically conducting material, maintains a close surface-to-surface proximity relationship with the surfaces of the pair of electrically conducting elongated members 1 and 2 for all instants during the displacement of the capacitively coupling member 3 following the center line of the combination of the pair of electrically conducting elongated members 1 and 2. The combination of the pair of elongated members 1 and 2, and the capacitively coupling member 3 provides two parallel electric circuits connecting the alternating electrical signal generator 11 and the device 18 measuring the phase angle difference between two alternating electrical signals respectively taken off from the two opposite extremities of one of the pair of elongated members 1 and 2, that is not physically connected to the signal generator 11, wherein the first electric circuit comprises a first portion of the combination of the pair of elongated members 1 and 2 located on one side of the capacitively coupling member 3, the lead wires 14 and 19 respectively connecting the first extremity 12 of the first elongated member 1 to the signal generator 11 and the first extremity 16 of the second elongated member 2 to the phase angle measuring device 18, and the capacitively coupling member 3 capacitively coupling the electric currents flowing through the pair of elongated members 1 and 2 to one another, while the second electric circuit comprises a second portion of the combination of the pair of elongated members 1 and 2 located on the other side of the capacitively coupling member 3 opposite to the one side thereof, the lead wires 15 and 20 respectively connecting the second extremity 13 of the first elongated member 1 to the signal generator 11 and the second extremity 17 of the second elongated member 2 to the phase angle measuring device 18, and the capacitively coupling member 3. The ohmic resistances of the two parallel electric circuits are respectively related to the position x of the capacitively coupling member 3 measured from the center section of the combination of the pair of elongated members 1 and 2 by equations $$R_1 = \propto (L-2x) + R_{W1} + R_I, \qquad (1)$$

and $$R_2 = \propto (L+2x) + R_{W2} + R_I, \qquad (2)$$

where $\propto$ is the ohmic resistance per unit length of each of the pair of electrically conducting elongated members 1 and 2, L is the length of the combination of the pair of elongated members 1 and 2, $R_{W1}$ and $R_{W2}$ are the ohmic resistances of the lead wires respectively included in the two parallel electric circuits, $R_I$ is the resistance belonging to the phase angle measuring circuit included in the phase angle measuring device 18. The capacitance of the two parallel electric circuits are respectively given by equations $$C_1 = \frac{\beta}{2}(L+2x) + C + C_{W1}, \qquad (3)$$

and $$C_2 = \frac{\beta}{2}(L-2x) + C + C_{W2}, \qquad (4)$$

where $\beta$ is the capacitance between the pair of elongated members 1 and 2 per unit length of the combination thereof, C is the capacitance of the capacitive coupling between the pair of elongated members 1 and 2 through the capacitive coupling member 3, and $C_{W1}$ and $C_{W2}$ are the capacitances of the lead wires respectively belonging to the two parallel electric circuits. When use of Equations (1), (2), (3) and (4) is made, it can be easily shown that the phase angles of two alternating electrical signals respectively taken off from the two opposite extremities 16 and 17 of the second elongated member 2 is given by equations $$\tan \phi_1 = \frac{1}{\omega[\alpha(L-2x) + R_{W1} + R_I]\left[\frac{\beta}{2}(L+2x) + C + C_{W1}\right]}, \qquad (5)$$

and $$\tan \phi_2 = \cfrac{1}{\omega \left[ \alpha(L+2x) + R_{W2} + R_I \right] \left[ \cfrac{\beta}{2}(L-2x) + C + C_{W2} \right]}, \quad (6)$$

where $\omega$ is the circular frequency of the alternating electrical signal supplied by the signal generator 11. When equations (5) and (6) are substituted into the difference formula of the trigonometric functions and use of the fact is made that the instrument resistance $R_I$ is much greater than the ohmic resistances of the pair of elongated members 1 and 2 and the connecting lead wires and that the total capacitance belonging to each of the two parallel electric circuits has a very small value as far as the alternating electrical signal has a frequency of order of kilo cycles or less and the combined value of the capacitance between the pair of elongated members 1 and 2 and the capacitance of the lead wires is much smaller than the capacitance C provided by the capacitively coupling member 3, is made, the following equation can be obtained:

$$\tan(\phi_1 - \phi_2) = \frac{1}{\omega R_I C} \left[ 2 \left( \frac{2\alpha}{R_I} - \frac{\beta}{C} \right) x + \left( \frac{R_{W2} - R_{W1}}{R_I} + \frac{C_{W2} - C_{W1}}{C} \right) \right]. \quad (7)$$

Equation (7) can be readily solved for the position x of the capacitively coupling member 3, that is related to the phase angle difference by equation $$x = \frac{1}{2 \left( \frac{2\alpha}{R_I} - \frac{\beta}{C} \right)} \left[ \omega R_I C \tan(\phi_1 - \phi_2) - \left( \frac{R_{W2} - R_{W1}}{R_I} + \frac{C_{W2} - C_{W1}}{C} \right) \right]. \quad (8)$$

In general, the position x of the capacitively coupling member 3 measured from the center section of the combination of the pair of electrically conducting elongated members 1 and 2 is given by equation $$x = A \tan(\phi_1 - \phi_2) - B, \quad (9)$$

where A and B are constants intrinsic to the structural arrangement of the position sensor. The position S of the capacitively coupling member 3 measured from one extremity of the combination of the pair of elongated members 1 and 2 is given by equation $$S = A \tan(\phi_1 - \phi_2) - C,$$

where $$C = B - \frac{L}{2}, \quad (10)$$

Equations (9) and (10) are approximate forms of the exact relationship between the position of the capacitively coupling member 3 and the phase angle difference between the two alternating electrical signals respectively taken off from the two opposite extremities of the second elongated member 2. The exact relationship between the position of the capacitively coupling member 3 and the phase angle difference $\Delta\phi = (\phi_1 - \phi_2)$ must be obtained empirically by calibrating the position sensor rather than deriving theoretically. The empirically obtained exact relationship between the position of the capacitively coupling member 3 and the phase angle difference $\Delta\phi$ may be expressed in the form $$s = f(\Delta\phi), \quad (11)$$

where the specific mathematical relationship defined by the function f must be determined empirically by calibrating the position sensor. By using an approach parallel to the derivation of equation (9) or (10), it can be shown that the position of the capacitively coupling member 3 relative to one of the two opposite extremities of the combination of the pair of elongated members can be determined by equation of the following form:

$$s = g(\Delta\phi'), \quad (12)$$

where $\Delta\phi'$ is the phase angle difference between the alternating electrical signal supplied to one of the two extremities of the first elongated member 1 and an alternating electrical signal taken off from one of the two opposite extremities of the second elongated member 2, wherein the two alternating electrical signals are supplied to and taken off from those extremities of the pair of electrically conducting elongated members located on the same side of capacitively coupling member 3. Of course, the specific mathematical relationship g must be determined empirically by calibrating the position sensor. The first embodiment of the position sensor of the present invention determines the position of the target by using the empirically determined equation (11) or (12). It becomes immediately evident from the analysis that has led from equations (1), (2), (3) and (4) to equations (10) and (11) that a position sensor may include a single electrically conducting elongated member and the alternating electrical signal may be supplied directly to the capacitively coupling member, wherein the position of the target is determined as a function of the phase angle difference between the two alternating electrical signal respectively taken off from the two opposite extremities of the single electrically conducting elongated member or as a function of the phase angle difference between the alternating electrical signal supplied to the capacitively coupling member and an alternating electrical signal taken off from one of the two opposite extremities of the single electrically conducting elongated member, which structural combination and method define the second embodiment of the position sensor of the present invention. It is well known fact that the ohmic resistivity of most material changes with changing temperature. In order to compensate for an error arising from the change of the specific ohmic resistance of the electrically conducting elongated member due to the changing temperature, equations (10) and (11) may include a temperature compensating term that eliminates the effect of temperature on the measurement of the position of the target member.

Figure 17:
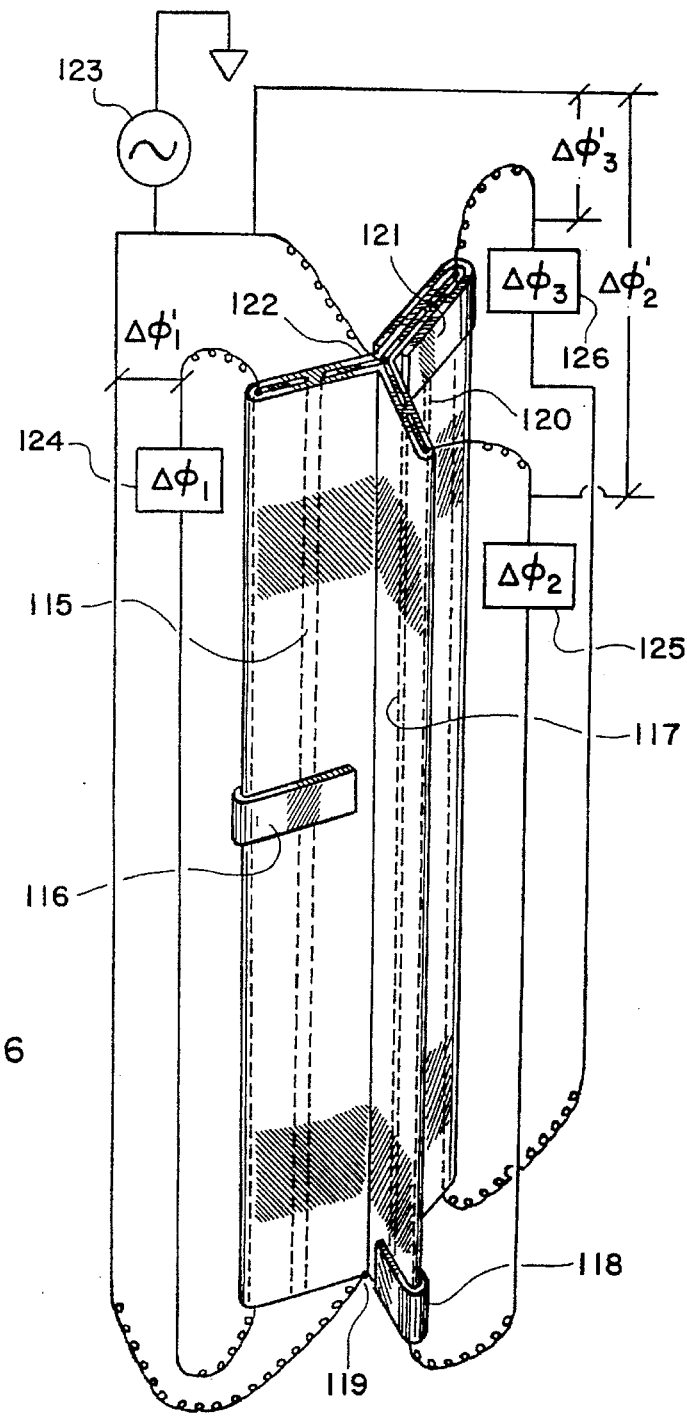
FIG. 17 illustrates an embodiment of the linear position sensor of the present invention comprising three pairs of electrically conducting elongated members.

The third embodiment of the position sensor of the present invention comprises three pairs of electrically conducting elongated members disposed in a side-by-side parallel relationship therebetween as shown in FIG. 17, wherein the first pair of elongated members has a first capacitively coupling member experiencing a displacement in direction parallel thereto, the second pair of elongated members has a second capacitively coupling member fixedly located at one of the two extremities of the combination of the three pairs of elongated members, and the third pair of elongated members has a third capacitively coupling member fixedly located at the other of the two extremities of the combination of the three pairs of elongated members. By using equation (8) it can be shown that the position s of the first capacitively coupling member moving with a target member can be determined by following equation:

$$s = \frac{L}{\tan\Delta\phi_3 - \tan\Delta\phi_2}(\tan\Delta\phi_1 - \tan\Delta\phi_2), \qquad (13)$$

where $\Delta\phi_1$, $\Delta\phi_2$ and $\Delta\phi_3$ are the phase angle differences respectively obtained from the three pairs of electrically conducting elongated members. Equation (13) can be written in the form $$s = p[\tan(\Delta\phi_1 - \Delta\phi_2), \tan(\Delta\phi_3 - \Delta\phi_2)], \qquad (14)$$

or $$s = q[(\Delta\phi_1 - \Delta\phi_2), (\Delta\phi_3 - \Delta\phi_2)], \qquad (15)$$

where the specific functional relationship p and q must be determined empirically by calibrating the position sensor. The equivalence relationship between equations (11) and (15) immediately shows that the position s of the capacitively coupling member can be determined from the following equation that is equivalent to equation (12):

$$s = y[(\Delta\phi'_1 - \Delta\phi'_2), (\Delta\phi'_3 - \Delta\phi'_2)], \qquad (16)$$

where the specific functional relationship y must be determined empirically. It is readily recognized that a position sensor comprising three single electrically conducting elongated members respectively including three capacitively coupling members directly receiving the alternating signal also determines the position of the target member by using equation (15) or (16).

It should be understood that the position sensors determining the position of the target by equation (15) or (16) measures the position without being influenced by the changing ambient condition such as the temperature and the surrounding electromagnetic field, while the position sensors determining the position of the target by equation (11) or (12) provides an economic means for measuring the position with a high degree of resolution.

DESCRIPTION OF ILLUSTRATED EMBODIMENTS

In FIG. 1 there is illustrated an embodiment of the linear position sensor of the present invention comprising a pair of electrically conducting elongated members 1 and 2 disposed in a side-by-side parallel relationship therebetween, and a capacitively coupling member 3 disposed in a relationship allowing a displacement thereof following the center line of the combination of the pair of elongated members 1 and 2. Each of the pair of elongated members 1 and 2 has a sizable surface area and the capacitively coupling member 3 also has a sizable surface area. The capacitively coupling member 3 and the pair of elongated members 1 and 2 maintain a close surface-to-surface proximity relationship therebetween at all instants during the displacement of the capacitively coupling member 3 relative to the pair of elongated members 1 and 2, whereby the capacitively coupling member 3 made of an electrically conducting material couples the electric currents flowing through the pair of elongated members 1 and 2 to one another by means of the electrical capacitance thereof. It is desired that the close surface-to-surface proximity relationship between the sizable surface area of the capacitively coupling member 3 and a section of the sizable surface area of the combination of the pair of elongated members 1 and 2 is maintained with a substantially constant dimensional tolerance in the gap or interface therebetween, whereby the level of the capacitive electrical coupling between the pair of elongated members 1 and 2 through the capacitively coupling member 3 remains at a substantially constant level at all instants. At least one of the pair of elongated members 1 and 2 must have a high ohmic resistance per unit length thereof, while the position sensor works best when both of the pair of elongated members 1 and 2 have the high specific ohmic resistance. In the particular illustrative embodiment, the pair of elongated members 1 and 2 are respectively built into or supported by two flanges or ribs 4 and 5 extending inwardly from the wall 6 of an elongated hollow cylindrical member 7. The flanges 4 and 5, and the elongated hollow cylindrical member 7 are made of an electrically nonconducting material such as a rigid plastic or ceramic material. The displacement of the capacitively coupling member 3 following the center line between the pair of elongated members 1 and 2 is guided by the edges of the flanges 4 and 5 having a constant gap therebetween, which edges guide a pair of rollers 8 and 9 included in the capacitively coupling member 3. The combination of the pair of elongated members 1 and 2, the capacitively coupling member 3, the pair of flanges 4 and 5, and the elongated hollow cylindrical member 7 is enclosed within a grounded metallic enclosure 10 providing an electromagnetic shielding from the ambient surroundings. The enclosure 10 may be constructed of a solid sheet or wire mesh made of an electrically conducting material. An alternating electrical signal generator 11 supplies an alternating electrical signal to the two opposite extremities 12 and 13 of the first elongated member 1 respectively through two lead wires 14 and 15. The two opposite extremities 16 and 17 of the second elongated member 2 are respectively connected to the two terminals included in a device 18 measuring the phase angle difference $\Delta\phi$ between two alternating electrical signals supplied to the two terminals of the phase angle difference measuring device 18 respectively through two lead wires 19 and 20. A data processor 21 determines the position of the capacitively coupling member 3 as a function of the measured phase angle difference $\Delta\phi$ between the two alternating electrical signals respectively taken off from the two opposite extremities 16 and 17 of the second elongated member 2 by using an empirically determined mathematical relationship given by equation (11). The specific ohmic resistance of the pair of elongated members 1 and 2 can change with the changing temperature, when the elongated members are made of a temperature sensitive material such as a plastic ribbon of a plastic material impregnated with carbon powders. A temperature sensor 22 measuring the temperature of the interior space within the metallic enclosure 10 may be included as an option, whereby information on the temperature of the pair of elongated members 1 and 2 is supplied to the data processor 21 that carries out an algorithm compensating for the effect of the temperature change on the measurement of the position of the target member due to the temperature change. In an alternative design, the lead wire 15 can be omitted, and the lead wires 20 connected to one of the two terminals of the phase angle difference measuring device 18 can be connected to the first extremity 12 of the first elongated member 1 or to the lead wire 14 supplying the alternating electrical signal to the first extremity 12 of the first elongated member 1 after removing the connection of the lead wire 20 from the second extremity 17 of the second elongated member 2, wherein the phase angle difference measuring device 18 measures the phase angle difference $\Delta\phi'$ between the alternating electrical signal supplied to the first extremity 12 of the first elongated member and an alternating electrical signal taken off from the first extremity 16 of the second elongated member 2. The data processor 21 determines the position of the target as a function of the measured phase angle difference $\Delta\phi'$ by using an empirically obtained mathematical relationship given by equation (12). Of course, the temperature sensor 22 can be included whereby the data processor 21 executes the temperature compensating algorithm in determining the position of the capacitively coupling member 3 as a function of the phase angle difference $\Delta\phi'$.

Figure 2:
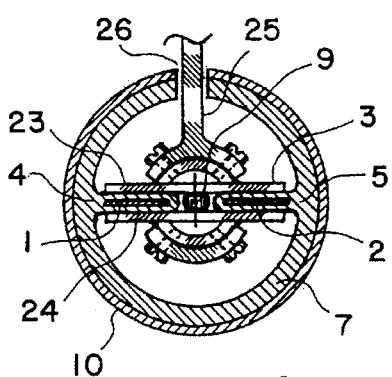
FIG. 2 illustrates a cross section of the position sensor shown in FIG. 1.

In FIG. 2 there is illustrated a cross section of the linear position sensor shown in FIG. 1, which cross section taken along plane 2—2 as shown in FIG. 1 illustrates with a greater clarity the freely sliding engagement between the capacitively coupling member 3 and the flanges 4 and 5. The capacitively coupling member 3 comprises two planar members 23 and 24 made of an electrically conducting material such as a metallic sheet or plate and connected to one another at the center line between the pair of elongated members 1 and 2, and simultaneously sandwich the two flanges 4 and 5 in a freely sliding relationship. The capacitively coupling member 3 may be mechanically connected to a target member under position sensing by a rigid arm 25 laterally extending from the capacitively coupling member 3 and through a slitted axially disposed opening 26 through the cylindrical walls of the hollow cylindrical elongated member 7 and the cylindrical metallic enclosure 10 as shown in the particular illustrative embodiment, or may be connected to a target member by a connecting rod disposed parallel to the center line between the pair of elongated members 1 and 2, and extending through a hole included in one end wall of the cylindrical metallic enclosure. The slitted axial opening 26 and holes included in the end walls of the cylindrical metallic enclosure 10 for routing the lead wires and/or the connecting arm or rod are not detrimental to the electromagnetic shielding provided by the cylindrical metallic enclosure 10, as the frequency of the alternating electrical signal supplied by the signal generator 11 is well below the microwave or radio wave frequencies and the openings of dimensions much less than the wave length of the alternating electrical signal supplied by the signal generator 11 do not degrade the quality of the electromagnetic shielding. It should be mentioned that the construction of the capacitively coupling member 3 comprising two planar members 23 and 24 sandwiching the pair of elongated members 1 and 2 therebetween is highly preferred, because firstly, it maintains a constant level of capacitive coupling independent of a small movement thereof in directions perpendicular to the plane including the pair of elongated members 1 and 2, as an increase in the gap between one of the two planar members 23 and 24 of the capacitively coupling member 3 and one side surface of the pair of elongated members 1 and 2 becomes compensated by a decrease in the gap between the other of the two planar members 23 and 24 of the capacitively coupling member 3 and the other side surface of the pair of elongated members 1 and 2, and secondly, the two sided close surface-to-surface proximity relationship between the capacitively coupling member 3 and the pair of elongated members 1 and 2 provides a large capacitance that increases the resolution in the position sensing as indicated by equation (8). Of course, the rollers 8 and 9 prevent the shifting movement of the capacitively coupling member 3 in directions parallel to the plane defined by the two flanges 4 and 5 relative to the edges thereof.

Figure 3:
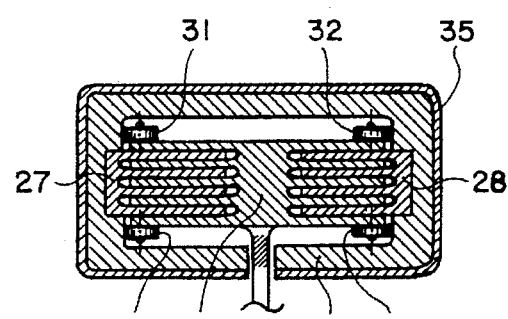
FIG. 3 illustrates a cross section of another embodiment of the position sensor comprising a pair of electrically conducting elongated members.

In FIG. 3 there is illustrated a cross section of another embodiment of of the position sensor comprising a pair of parallel elongated members 27 and 28, each of which elongated members has a plurality of parallel axial grooves. The pair of elongated members 27 and 28 are disposed in such a way that the openings of the plurality of parallel axial grooves included in each of the pair of elongated members 27 and 28 face one another, and are simultaneously engaged in a freely sliding relationship by two sets of plurality of flanges included in the capacitively coupling member 29. An electrically insulating hollow cylinder 30 having a rectangular cross section anchors the pair of elongated members 27 and 28 and guides four rollers 31, 32, 33 and 34 included in the capacitively coupling member 29. The electrically insulating hollow cylinder 30 also provides the required separation between the elctromagnetically shielding enclosure 35 and the combination of the pair of elongated members 27 and 28, and the capacitively coupling member 29.

Figure 4:
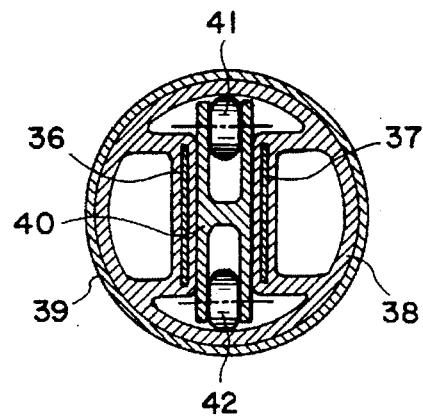
FIG. 4 illustrates a cross section of a further embodiment of the position sensor comprising a pair of electrically conducting elongated members.

In FIG. 4 there is illustrated a cross section of a further embodiment of the position sensor comprising a pair of elongated members 36 and 37 disposed in a face-to-face relationship therebetween within and anchored to an insulating hollow cylinder 38, that is sheathed by a metallic enclosure 39. The capacitively coupling member 40 disposed between the pair of elongated members 36 and 37 in a freely sliding relationship is guided by two rollers 41 and 42.

Figure 5:
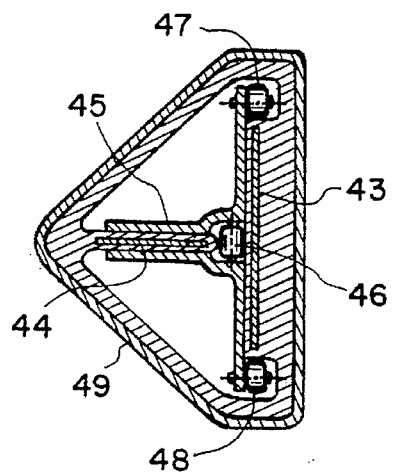
FIG. 5 illustrates a cross section of yet another embodiment of the position sensor comprising a pair of electrically conducting elongated members.

In FIG. 5 there is illustrated a cross section of yet another embodiment of the position sensor employing a pair of elongated members 43 and 44 disposed in a T-shaped cross sectional geometry. A capacitively coupling member 45 having a T-shaped cross sectional geometry maintains a close surface-to-surface proximity relationship with the first elongated member 43 in a face-to-face relationship and with the second elongated member 44 in a sandwiching relationship. The capacitively coupling member 45 is guided by three rollers 46, 47 and 48. The metallic enclosure 49 electromagnetically shields the the combination of the pair of elongated members 43 and 44, and the capacitively coupling member 45 from the conductors, capacitors and electromagnetic field existing outside of the metallic enclosure 49. One obvious embodiment of the position sensor, that is not shown as an illustrative example, comprises a pair of elongated members of circular cylindrical shell geometry disposed in a coaxial relationship, and a capacitively coupling member having a shape of circular cylindrical ring that fills up the annular space between the pair of of elongated members. Of course, the combination of the pair of elongated members and the capacitively coupling members must be enclosed within a metallic enclosure providing the electromagnetic shielding.

Figure 6:
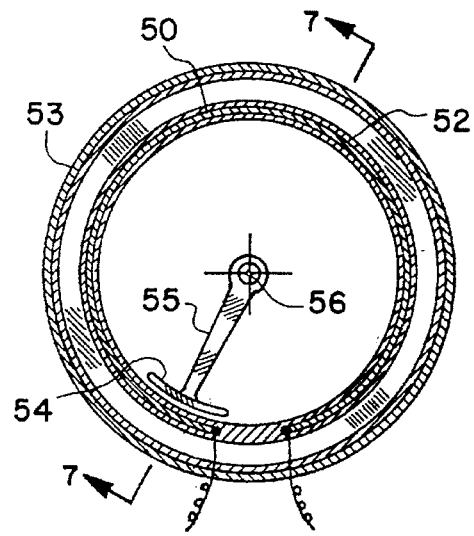
FIG. 6 illustrates an embodiment of the rotary position sensor of the present invention comprising a pair of electrically conducting elongated members.

In FIG. 6 there is illustrated an embodiment of the rotary position sensor comprising a pair of elongated members 50 and 51 (elongated member 51 is not visible in the particular illustration as it is hidden behind 50) disposed circumferentially on a circular cylindrical surface in a side-by-side parallel relationship therebetween, wherein the pair of elongated members 50 and 51 are supported by by a dielectric cylindrical shell 52 that is sheathed by a metallic cylindrical shell 53 having two closed ends. The capacitively coupling member 54 having an outer surface coinciding with a circular cylindrical surface coaxial to the pair of elongated members 50 and 51 is supported by an arm 55 rotatable about the central axis 56 of the circular cylindrical surface including the pair of elongated members 50 and 51, wherein the outer surface of the capacitively coupling member 54 maintains a close surface-to-surface proximity relationship with both of the pair of elongated members 50 and 51 during all phases of rotary displacement of the capacitively coupling member 54 about the central axis 56.

Figure 7:
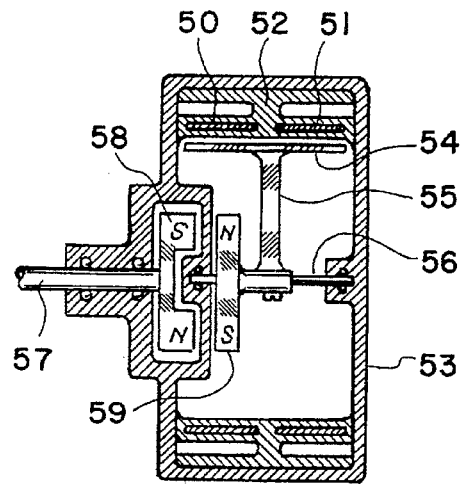
FIG. 7 illustrates a cross section of the position sensor shown in FIG. 6.

In FIG. 7 there is illustrated a cross section of the rotary position sensor shown in FIG. 6, which cross section taken along plane 7—7 as shown in FIG. 1 illustrates with a greater clarity the arrangement of the pair of elongated members 50 and 51 disposed on a common circular cylindrical surface coaxial to the central axis 56, and the capacitively coupling member 54 supported by the arm 55 rotatably about the central axis 56, wherein the combination of the pair of elongated members 50 and 51, and the capacitively coupling member 54 is enclosed within a metallic enclosure 53. The rotary sensor operates on the same principles as the operating principles of the linear position sensor shown in FIG. 1 with one exception that the rotary position sensor measures position of a target member along the circumference of the circular cylindrical surface, while the linear position sensor measures position of a target member following a rectilinear line of the displacement of the target member. Of course, the angular displacement can be obtained from the circumferential displacement provided by the rotary sensor by dividing the circumferential displacement by the radius of the circular cylindrical surface defined by the pair of elongated members 50 and 51. In this particular illustrative embodiment, the rotary displacement of the capacitively coupling member 54 about the central axis 56 represents the rotary displacement of a target member fixedly mounted on the rotary motion transmitting shaft 57 that transmits the rotary motion of the rotary motion transmitting shaft 57 to the rotary motion of the capacitively coupling member 54 by means of a magnetic motion coupler comprising a pair of permanent magnets 58 and 59 respectively affixed to the two shafts 57 and 56. In an alternative design, the rotary displacement of a target member may be mechanically coupled to the rotary displacement of the capacitively coupling member 54 or the capacitively coupling member 54 or the supporting arm 55 may be the target itself. The magnetic displacement coupling included in the particular illustrative embodiment suggests that the linear displacement of the capacitively coupling member 40 or 45 shown in FIG. 4 or 5 may be made of a ferromagnetic material and coupled to the displacement of a target member including a permanent magnet, that is disposed outside of the sealed metallic enclosure 39 or 49.

Figure 8:
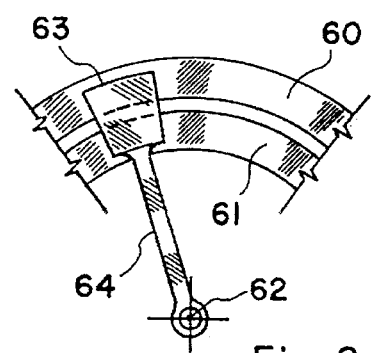
FIG. 8 illustrates another embodiment of the rotary position sensor comprising a pair of electrically conducting elongated members.

In FIG. 8 there is illustrated another embodiment of the rotary position sensor comprising a pair of electrically conducting planar members 60 and 61 of circular annular geometry disposed on a common plane in a concentric relationship to a central axis 62. The capacitively coupling member 63 disposed on a plane closely adjacent to the plane defined by the pair of circular annular members 60 and 61, is supported by an arm 64 rotatable about the central axis 62, wherein the capacitively coupling member 63 maintains a close surface-to-surface proximity relationship with both of the pair of circular annular members 60 and 61 during all phases of rotary displacement about the central axis 62. The rotary position sensors shown in FIGS. 6 and 8 determines the rotary position of the capacitively coupling member or the rotary position of the arm supporting the capacitively coupling member as a function of the phase angle difference $\Delta\phi$ between two alternating electrical signals respectively taken off from the two opposite circumferential extremities of one of the pair of elongated or circular annular members that does not receive the alternating electrical signal from the signal generator, or as a function of the phase angle difference $\Delta\phi'$ between the alternating electrical signal supplied to one circumferential extremity of the first elongated or circular annular member and an alternating electrical signal taken off from one circumferential extremity of the second elongated or circular annular member.

Before proceeding to show a few representative applications of the linear and rotary position sensors of the present invention, a number of important conditions required to make the position sensor work accurately and sensitively should be mentioned. As indicated by equation (8), the individual elongated member must have a high specific ohmic resistance and the capacitively coupling member must maintain a close surface-to-surface proximity relationship with each of the pair of elongated members over a sizable surface area in order to provide a high resolution in measuring the position of the target member moving with the capacitively coupling member. This condition requires that the individual elongated member must have a sizable surface area and, consequently, the individual elongated member must be made of a material having a high ohmic resistivity into a shape of a ribbon or a flat bar, and the capacitively coupling member must have a sizable area under a close surface-to-surface proximity relationship with a section of the surfaces of the pair of elongated members. It is important that the value of the electric capacitance associated with the capacitively coupling member remains substantially constant. The amplitude of the alternating electrical signal must be maintained at a substantially constant level. The phase angle difference determining the position of the capacitively coupling member changes very acutely as a result of the electrically conducting objects, capacitive elements and low frequency alternating electromagnetic field existing in the ambient surroundings. Therefore, the assembly including the pair of elongated members and the capacitively coupling member must be enclosed within an electromagnetically shielding enclosure made of an electrically conducting solid sheet or wire mesh, that is well grounded. The position sensor works best when the individual electrically conducting elongated members and the capacitively coupling member are sheathed, coated or lined with a layer of electrically insulating material, whereby the ambient media occupying the surroundings of the combination of the pair of elongated members and the capacitively coupling member do not alter the electrical parameters of the position sensor. When the above-mentioned conditions are satisfied, it is not difficult to construct a position sensor capable of measuring the position of a target member with increments of every one hundredth of an inch, and it is possible to construct a position sensor measuring the position with increments of every few thousandth of an inch.

Figure 9:
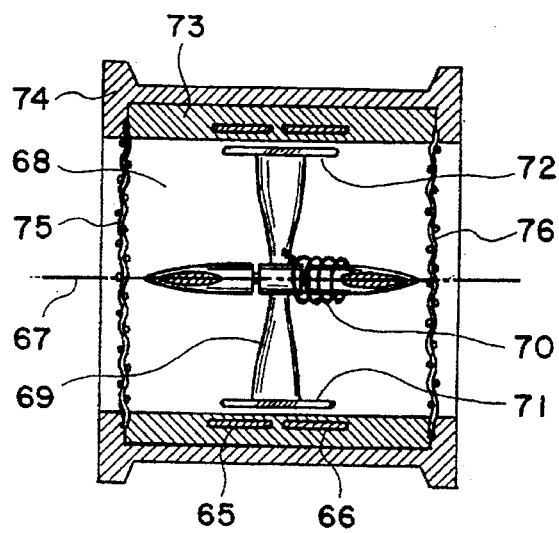
FIG. 9 illustrates a cross section of an embodiment of the nonrotating propeller flowmeter employing the rotary position sensor comprising a pair of electrically conducting elongated members.
Figure 23:
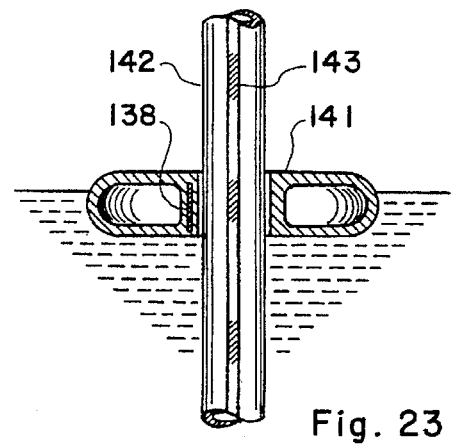
FIG. 23 illustrates an embodiment of the liquid level sensor employing the linear position sensor comprising three pairs of electrically conducting elongated members.

In FIG. 9 there is illustrated a cross section of an embodiment of the nonrotating propeller or nonrotating turbine flowmeter that employs the rotary position sensor comprising a pair of elongated members 65 and 66 disposed in a side-by-side parallel relationship on a circular cylindrical surface coaxial to the center line 67 of the flow passage 68 having a circular cross section. A propeller or turbine 69 is disposed on a cross section of the flow passage 68 rotatably about the center line 67 of the flow passage 68, wherein a torsion spring 70 prodides a bias torque countering the fluid dynamic torque exerted on the propeller or turbine 69 by the fluid media moving through the flow passage 68, which bias torque keeps the propeller or turbine 69 at the zero position having a stop that prevents the propeller or turbine 69 from experiencing a rotary displacement in a direction opposite to the direction of the fluid dynamic torque, when the fluid media in the flow passage 68 is stationary. The capacitively coupling member 71 of a curved planar geometry maintaining a close surface-to-surface proximity relationship with the pair of elongated members 65 and 66 is affixed to the tip of one propeller or turbine blade, while a dummy capacitively coupling member 72 made of a dielectric meterial is affixed to the tip of the other propeller or turbine blade in a diametrically opposite arrangement to the real capacitively coupling member 71. The axisymmetric construction of the propeller or turbine 69 including the real and dummy capacitively coupling members 71 and 72 provides the structural and fluid dynamic symmetry enhancing the performance of the flowmeter. The dielectric sleeve 73 supporting the pair of elongated members 65 and 66 is sheathed by a metallic cylindrical shell 74, which together with two metallic wire meshes 75 and 76 respectively covering the inlet and outlet ends of the flow passage 68 provides the electromagnetic shielding. The fluid dynamic torque proportional to the dynamic pressure, that is equal to one half of the fluid density times the square of the fluid velocity, is determined as a function of the rotary displacement of the propeller or turbine 69 as a measure of the flow rate of the fluid media moving through the flow passage 68, as the velocity of the fluid media is readily determined from the measured dynamic pressure of fluid flow when the density of the fluid media is known or measured. The covering of the inlet and outlet ends of the flow passage 68 with the wire meshes 75 and 76 may be omitted by extending the metallic cylindrical shell 74 to a greater length in both directions from the propeller or turbine 69. FIG. 23 illustrates an end view of a nonrotating propeller or turbine disposed within a flow passage in an arrangement similar to that employed in the construction of the nonrotating propeller or turbine flowmeter shown in the particular illustrative embodiment.

Figure 10:
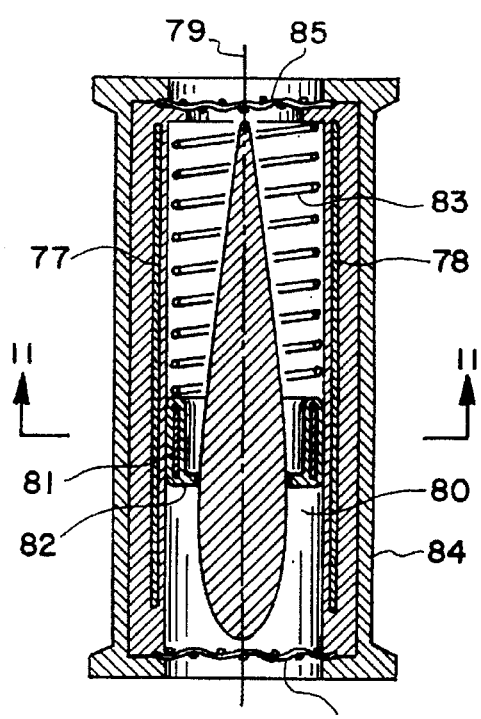
FIG. 10 illustrates a cross section of an embodiment of the variable area flowmeter employing the linear position sensor comprising a pair of electrically conducting elongated members.

In FIG. 10 there is illustrated a cross section of an embodiment of the variable area flowmeter that employs the linear position sensor comprising a pair of elongated members 77 and 78 disposed axially on a circular cylindrical surface coaxial to the center line 79 of a tapered flow passage 80, wherein the pair of elongated members are respectively disposed along the two diametrically opposite halves of the wall of the tapered flow passage 80. The capacitively coupling member 81 of a circular cylindrical shell or ring geometry under a close surface-to-surface proximity relationship with the pair of elongated members 77 and 78 is included in a displaceable or movable orifice member 82 of a circular cylindrical ring geometry. The coil spring 83 provides a bias force countering the fluid dynamic drag force exerted on the diplaceable orifice member 82 by the fluid media moving through the tapered flow passage 80. The drag force experienced by the displaceable orifice member 82 is determined as a function of the linear position thereof. As the drag force is proportional to the dynamic pressure of the fluid flow, the velocity of the fluid media is determined as a function of the linear position of the displaceable orifice member 82. The electromagnetic shielding is provided by the metallic circular cylindrical shell 84 and two metallic wire meshes 85 and 86 respectively covering the inlet and outlet sections of the tapered flow passage 80. The pair of metallic wire meshes 85 and 86 can be omitted by extending the metallic circular cylindrical shell 84 to a greater length. When the variable area flowmeter is installed in an up-right vertical position, the coil spring 83 can be omitted as the weight of the displaceable orifice member 82 provides the bias force countering the drag force exerted on the displaceable orifice member 82 by the flow of the fluid media. In an alternative design, the variable area flowmeter may have a tapered flow passage between a circular cylindrical core of a constant diameter and a tapered outer cylindrical wall coaxially disposed to the circular cylindrical core of the constant diameter, wherein a pair of electrically conducting elongated members constituting the linear position sensor are included in the circular cylindrical core of the constant diameter.

Figure 11:
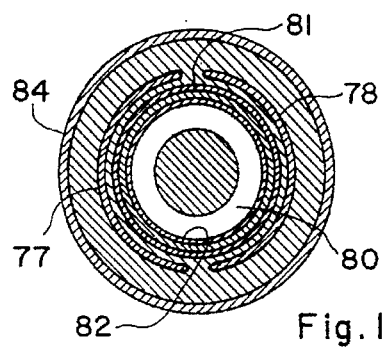
FIG. 11 illustrates another cross section of the variable area flowmeter shown in FIG. 10.

In FIG. 11 there is illustrated another cross section of the variable area flowmeter shown in FIG. 10, which cross section taken along plane 11—11 as shown in FIG. 10 illustrates with a greater clarity the arrangement of the linear position sensor comprising the pair of elongated members 77 and 78 included in the outer cylindrical wall of the tapered flow passage 80, and the capacitively coupling member 81 included in the displaceable orifice member 82.

Figure 12:
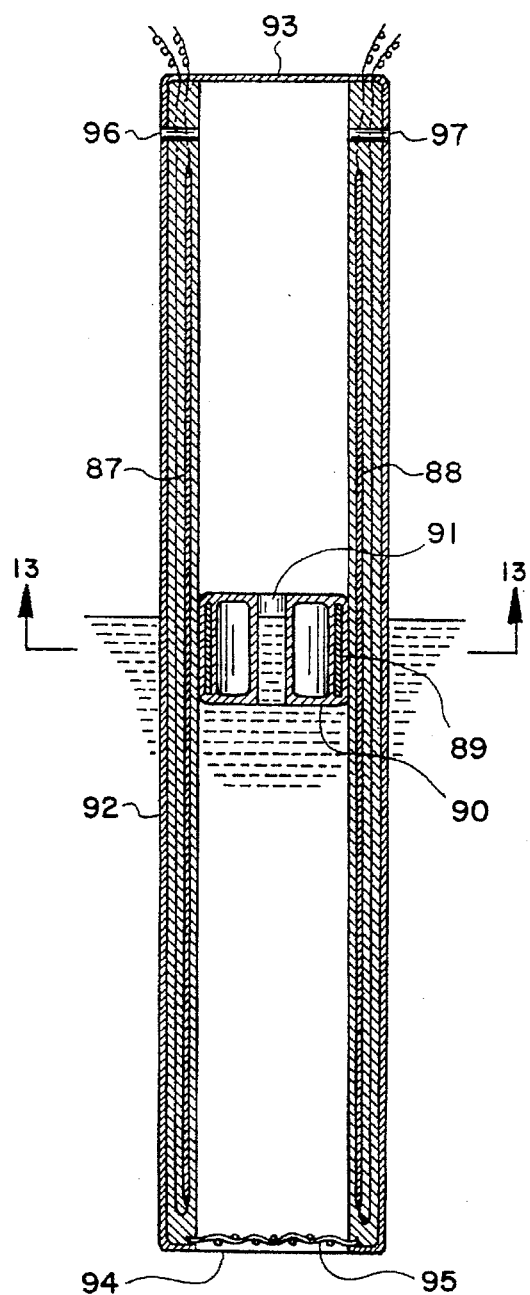
FIG. 12 illustrates a cross section of an embodiment of the liquid level sensor employing the linear position sensor comprising a pair of electrically conducting elongated members.

In FIG. 12 there is illustrated a cross section of an embodiment of the liquid level sensor employing the linear position sensor comprising a pair of elongated members 87 and 88, and the capacitively coupling member 89, which combination is disposed in an arrangement similar to the combination of the corresponding elements included in the embodiment shown in FIG. 10. Of course, the capacitively coupling member of a circular cylindrical shell geometry is now included in a float 90 having a centrally located vent hole 91, wherein the float 90 floats on the free surface of a liquid medium. The metallic enclosure 92 providing the electromagnetic shielding has a closed top end 93 and an open bottom end 94 covered with a metallic wire mesh 95. The vent holes 96 and 97 are disposed through the enclosure wall housing the linear position sensor assembly at a section near the closed top end 93. The liquid level is determined by adding a constant to or subtracting a constant from the position of the capacitively coupling member 89, which constant is determined empirically by calibrating the liquid level sensor. It should be understood that, when the liquid medium under level measurement is an electrically conducting medium, the capacitively coupling member 89 included in the linear position sensor can be omitted, as the electrically conducting liquid medium plays the role of capacitively coupling the pair of elongated members 87 and 88.

Figure 13:
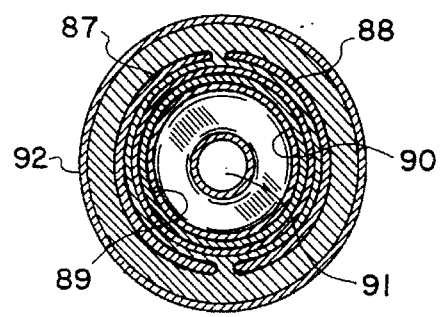
FIG. 13 illustrates another cross section of the liquid level sensor shown in FIG. 12.

In FIG. 13 there is illustrated another cross section of the liquid level sensor shown in FIG. 12, which cross section taken along plane 13—13 as shown in FIG. 12 illustrates with a greater clarity the arrangement of the pair of elongated members 87 and 88, and the capacitively coupling member 89 included in the float 90.

Figure 14:
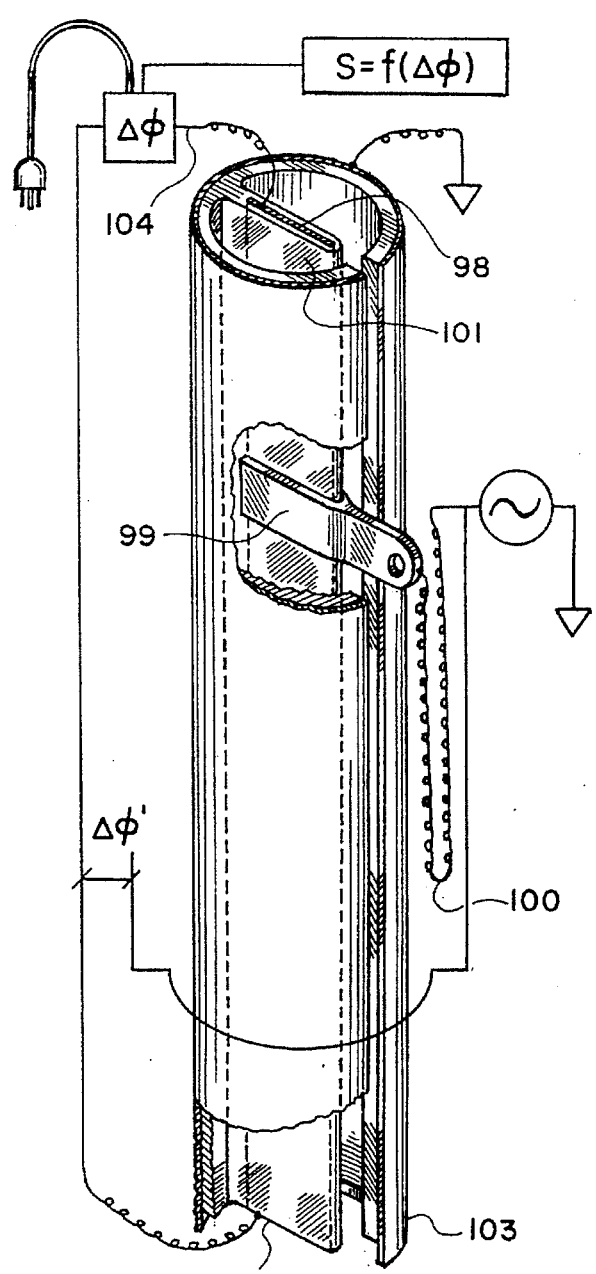
FIG. 14 illustrates an embodiment of the linear position sensor of the present invention comprising a single electrically conducting elongated member.

In FIG. 14 there is illustrated an embodiment of the linear position sensor of the present invention, that comprises a single electrically conducting elongated member 98 having a high specific ohmic resistance and a capacitively coupling member 99 under a close surface-to-surface proximity relationship with the single elongated member 98 The position sensor works when the capacitively coupling member 99 is made of a metal, and coated or lined with an electrically insulating layer. An alternating electrical signal is directly supplied to the capacitively coupling member 99 through a lead wire 100 physically connected to the capacitively coupling member 99, while the phase angle difference $\Delta\phi$ between two alternating electrical signals respectively taken off from the two opposite extremities 101 and 102 of the single elongated member 98 is measured. The position of the capacitively coupling member 99 representing the position of a target member is determined as a function of the measured phase angle difference $\Delta\phi$. It should be understood that the combination of the single elongated member 98 and the capacitively coupling member 99 must be enclosed within a grounded metallic enclosure 103. Another embodiment of the position sensor comprising a single elongated member can be constructed by modifying the position sensor shown in FIG. 1. When the first elongated member 1 and the capacitively coupling member 3 included in the position sensor shown in FIG. 1 are made of a highly electrically conductive metal, and the side surfaces of the first elongated member 1 and one half of the surface of the capacitively coupling member 3 adjacent to the side surfaces of the first elongated member 1 have bare surfaces and are under a physical contact therebetween whereby the alternating electrical signal is directly transmitted between the first elongated member 1 and the capacitively coupling member 3 by the electrical conduction, the position sensor shown in FIG. 1 operates on the same principles as those of the position sensor comprising a single elongated member 98 shown in FIG. 14. In an alternative design of the position sensor shown in FIG. 14 or the above-described revised version of the position sensor shown in FIG. 1, the lead wires 104 and 15 can be omitted and the phase angle difference $\Delta\phi'$ between the alternating electrical signal conductively supplied to the capacitively coupling member and an alternating electrical signal taken off from one of the two opposite extremities of the single elongated member can be measured, wherein the position of the capacitively coupling member is determined as a function of the measured phase angle difference.

Figure 15:
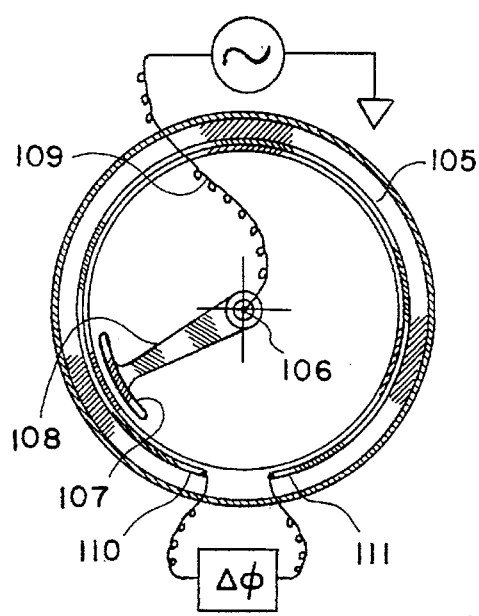
FIG. 15 illustrates an embodiment of the rotary position sensor of the present invention comprising a single electrically conducting elongated member.

In FIG. 15 there is illustrated an embodiment of the rotary position sensor of the present invention comprising a single elongated member 105 disposed circumferentially on a circular cylindrical surface coaxial to a center line 106. The capacitively coupling member 107 made of a metal and covered with an electrically insulating layer and under a close surface-to-surface proximity relationship with the single elongated member 105 is supported by a metallic arm 108 rotatable about the center line 106, wherein the metallic capacitively coupling member 107 and the metallic arm 108 are physically connected to one another in a metal-to-metal connection conductively transmitting an electric current. An alternating electrical signal is supplied to the capacitively coupling member 107 through a combination of the arm 108 and a lead wire 109 physically connected to the hub of the arm 108 or a metallic spindle rotatably supporting the arm 108. The rotary position of the capacitively coupling member 107 or that of the arm 108 is determined as a function of the phase angle difference $\Delta\phi$ between two alternating electrical signals respectively taken off from the two opposite extremities 110 and 111 of the single elongated member 105. In an alternative mode of operation, the rotary position can be determined as a function of phase angle difference $\Delta\phi'$ between the alternating electrical signal conductively supplied to the capacitively coupling member 107 and an alternating electrical signal taken off from one of the two opposite extremities of the elongated member 105.

Figure 16:
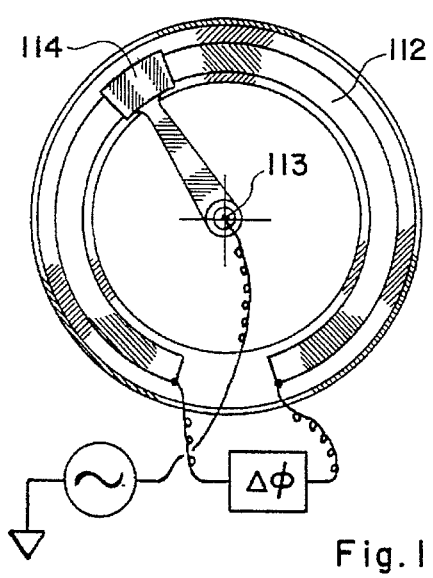
FIG. 16 illustrates another embodiment of the rotary position sensor comprising a single electrically conducting elongated member.

In FIG. 16 there is illustrated another embodiment of the rotary position sensor that has essentially the same construction as that of the embodiment shown in FIG. 15 with one exception. In this particular illustrative embodiment, an electrically conducting member 112 having a circular annular geometry is disposed coaxially to a center line 113 on a plane perpendicular to the center line 113, and the capacitively coupling member 114 is disposed on another plane closely adjacent and parallel to the plane defined by the electrically conducting member 112.

In FIG. 17 there is illustrated an embodiment of the linear position sensor of the present invention comprising three pairs of electrically conducting elongated members disposed in a side-by-side parallel relationship therebetween, wherein each of the three pairs of elongated members has essentially the same construction and the same operating principles as those of the pair of elongated members 1 and 2 included in the embodiment shown in FIG. 1. The first pair 115 of elongated members has a capacitively coupling member 116 built into or connected to a target member, wherein the capacitively coupling member 116 experiences a displacement following the center line betweem the first pair 115 of elongated members. The second pair 117 of elongated members has a capacitively coupling member 118 fixedly disposed at a first extremity 119 of the combination of the three pairs of elongated members. The third pair 120 of elongated members has a capacitively coupling member 121 fixedly disposed at a second extremity 122 of the combination of the three pairs of elongated members. The alternating electrical signal generator 123 supplies an alternating electrical signal to both of the two opposite extremities of the first of each pair of elongated members, while each of three phase angle difference measuring devices 124, 125 and 126 measures a phase angle difference between two alternating electrical signals respectively taken off from the two opposite extremities of the second of each pair of elongated members. The position of the capacitively coupling member 116 or that of a target member kinematically coupled to the capacitively coupling member 116 is measured as a function of three phase angle differences $\Delta\phi_1$, $\Delta\phi_2$ and $\Delta\phi_3$ respectively provided by the three phase angle difference measuring devices 124, 125 and 126 in accordance with the principles described in conjunction with equation (15). In an alternative mode of operation, the alternating electrical signal is supplied to only one of the two opposite extremities of the first of each pair of elongated members, and each of three phase angle differences $\Delta\phi'_1$, $\Delta\phi'_2$ and $\Delta\phi'_3$ is taken by measuring a phase angle difference between the alternating electrical signal supplied to the one extremity of the first of each pair of elongated members and an alternating electrical signal taken off from only one of the two opposite extremities of the second of each pair of elongated members, wherein the one extremity of the first and the one extremity of the second of each pair of elongated members are located on the same side of the capacitively coupling member associated with each pair of elongated members, wherein the position of the capacitively coupling member or that of the target member represented thereby is determined as a function of three phase angle differences $\Delta\phi'_1$, $\Delta\phi'_2$ and $\Delta\phi'_3$ in accordance with the principles described in conjunction with equation (16). It should be noticed that, in the particular illustrative embodiment, the first of each pair of elongated members receiving the alternating electrical signal from the signal generator 123 are combined into a single integral assembly having a trifurcate cross sectional geometry. In an alternative design, the three pairs of elongated members may be electrically as well as physically isolated from each other as exemplified by the embodiment shown in FIGS. 20, 21 and 22. The particular assembly of the three pairs of elongated members shown in FIG. 17 is particularly useful, when the first of each pair of elongated members assembled into an integral structure having the trifurcate cross section, that receives the alternating electrical signal from the signal generator 123, is made of a highly conductive metal, while the second of each pair of elongated members is made of a material of high ohmic resistivity such a ceramic or a synthetic material impregnated with carbon powders.

Figure 18:
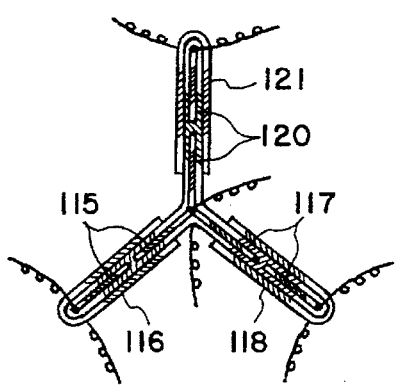
FIG. 18 illustrates an end view of the position sensor shown in FIG. 17.

In FIG. 18 there is illustrated an end view of the position sensor shown in FIG. 17. The position sensor shown in FIGS. 17 and 18 works best, when it is enclosed within a metallic enclosure providing an electromagnetic shielding as explained in conjunction with FIG. 1.

Figure 19:
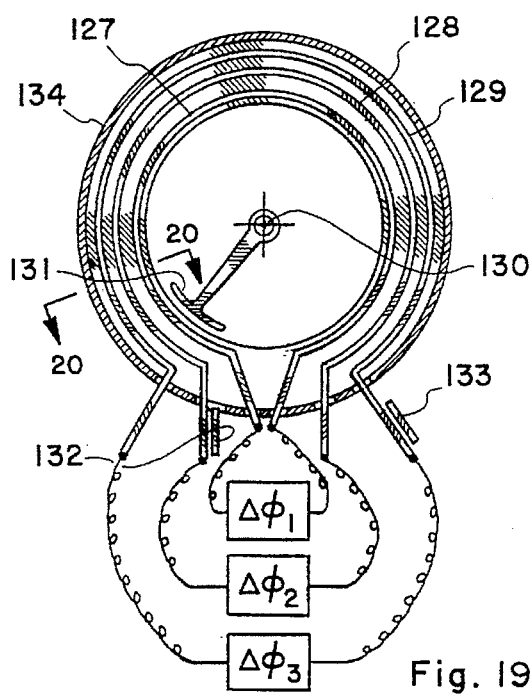
FIG. 19 illustrates an embodiment of the rotary position sensor of the present invention comprising three pairs of electrically conducting elongated members.

In FIG. 19 there is illustrated an embodiment of the rotary position sensor of the present invention comprising three pairs 127, 128 and 129 of elongated members respectively disposed circumferentially on three circular cylindrical surfaces coaxial to a common center line 130. The combination of the first pair 127 of elongated members and the capacitively coupling member 131 is a curved version of the combination of the first pair 115 of elongated members and the capacitively coupling member 116 included in the embodiment shown in FIG. 17. The combination of the second pair 128 of elongated members and the capacitively coupling member 132 and the combination of the third pair 129 of elongated members and the capacitively coupling member 133 respectively correspond to the combination of the second pair 117 of elongated members and the capacitively coupling member 118 and the combination of the third pair 120 of elongated members and the capacitively coupling member 121 included in the embodiment shown in FIG. 17. The metallic enclosure 134 surrounding the position sensing elements provides the electromagnetic shielding. The rotary position sensor shown in FIG. 19 operates on the same principles as those of the linear position sensor described in conjunction with FIG. 17.

Figure 20:
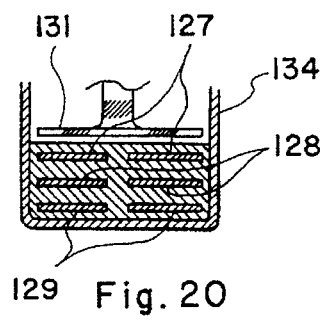
FIG. 20 illustrates a cross section of the position sensor shown in FIG. 19.

In FIG. 20 there is illustrated a cross section of the rotary position sensor shown in FIG. 19, which cross section taken along plane 20—20 as shown in FIG. 19 illustrates with a greater clarity the coaxially layered disposition of the three pairs 127, 128 and 129 of elongated members and one 131 of the three capacitively coupling members.

Figure 21:
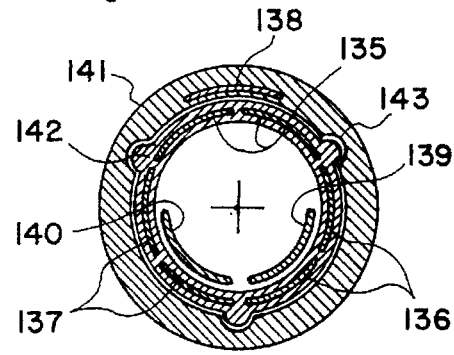
FIG. 21 illustrates a cross section of another embodiment of the position sensor comprising three pairs of electrically conducting elongated members.

In FIG. 21 there is illustrated a cross section of another embodiment of the rotary position sensor comprising three pairs 135, 136 and 137 of elongated members and the three capacitively coupling members 138, 139 and 140 The capacitively coupling member 138 is built into a hollow cylindrical collar or ring 141 sliding on the hollow cylindrical member 142 providing a supporting structure securing the three pairs of elongated members. The two stationary capacitively coupling members 139 and 140 are respectively disposed fixedly at the two opposite extremities of the two pairs 136 and 137 of elongated members. The combination 143 of the keys and key ways maintains the proper line up between the first pair 135 of elongated members and the capacitively coupling member 138 maintaining the close surface-to-surface proximity relationship with the first pair 135 of elongated members. It becomes clear from the embodiments shown in FIGS. 12 and 13 that, in an alternative design, the collar 141 including the capacitively coupling member 138 can be disposed within the hollow cylindrical member 142 rather than outside thereof, and the exterior surface of the hollow cylindrical member 142 can be coated or lined with a layer of an electrically conducting material providing the electromagnetic shielding.

Figure 22:
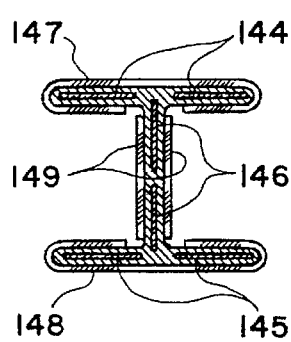
FIG. 22 illustrates a cross section of a further embodiment of the position sensor comprising three pairs of electrically conducting elongated members.

In FIG. 22 there is illustrated a cross section of a further embodiment of the position sensor comprising three pairs 144, 145 and 146 of elongated members assembled into an I-beam structure. The capacitively coupling member 147 slides on one of the two flanges of the I-beam structure, while the capacitively coupling members 148 and 149 are respectively disposed fixedly at the two opposite extremities of the I-beam structure. The combination of the I-beam assembly of the three pairs of elongated members and the three capacitively coupling members may be enclosed within an elongated metallic shell container providing the electromagnetic shielding.

The various embodiments of the position sensor shown in FIGS. 17, 19, 20, 21 and 22 comprise three component position sensors, one with a displaceable capacitively coupling member and the other two with the stationary capacitively coupling members, wherein the individual component position sensor is the same as or similar to the position sensor shown and described in conjunction with FIGS. 1, 6 and 8. It becomes immediately clear that a modified versions of the position sensors shown in FIGS. 17, 19, 20, 21 and 22 can be constructed by using three individual position sensors respectively comprising the single elongated member such as that shown in FIG. 14, 15 or 16 in place of the three individual position sensors respectively including the pair of elongated members. Such a modified version of the position sensor comprising the three individual position sensors operates on the same principles as those described in conjunction with FIGS. 17 or 19.

In FIG. 23 there is illustrated an embodiment of the liquid level sensor employing the linear position sensor comprising three pairs of elongated members such as the position sensor shown in FIG. 21. The capacitively coupling member 138 built into the collar 141 included in the position sensor shown in FIG. 21 now constitutes a float floating on the free surface of a liquid medium. It becomes immediately clear from the embodiment shown in FIGS. 12 and 13 that the liquid level sensor shown in FIG. 23 can be readily modified to the type of liquid level sensor shown in FIGS. 12 and 13, that included the float inside of the elongated hollow cylindrical member including the three pairs of elongated members rather than outside thereof.

Figure 24:
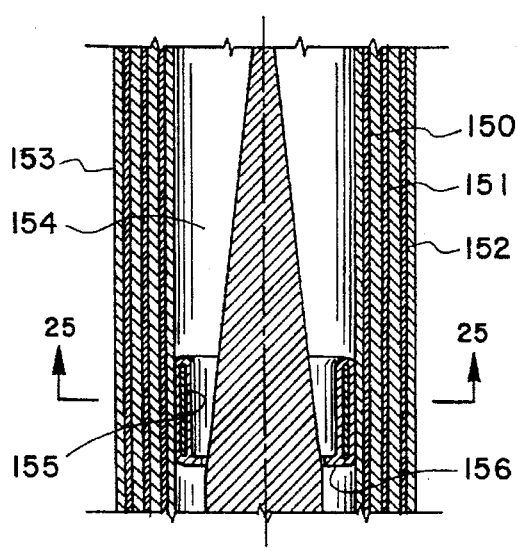
FIG. 24 illustrates a cross section of an embodiment of the variable area flowmeter employing the linear position sensor comprising three pairs of electrically conducting elongated members.

In FIG. 24 there is illustrated a cross section of an embodiment of the variable area flowmeter operating on the same principles as those of the variable area flowmeter shown in FIG. 10. The variable area flowmeter shown in the particular illustrative embodiment employs a linear position sensor comprising three pairs 150, 151 and 152 of elongated members disposed within the outer wall 153 of the tapered annular flow passage 154 in a coaxially layered arrangement. The capacitively coupling member 155 associated with the first pair 150 of elongated members is included in the displaceable or movable orifice member 156 of a circular cylindrical shell or ring geometry. The second and third pairs 151 and 152 of elongated members respectively have two stationary capacitively coupling members of a circular cylindrical shell geometry, which are fixedly disposed respectively at the two opposite extremities of the combination of the three pairs of elongated members in an arrangement exemplified by the embodiment shown in FIG. 17.

Figure 25:
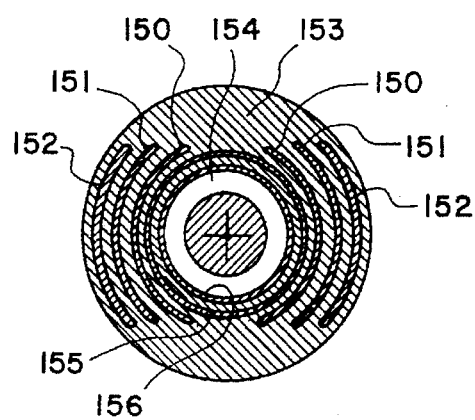
FIG. 25 illustrates another cross section of the variable area flowmeter shown in FIG. 24.

In FIG. 25 there is illustrated another cross section of the variable area flowmeter shown in FIG. 24, which cross section taken along plane 25—25 as shown in FIG. 24 illustrates the coaxially layered disposition of the three pairs 150, 151 and 152 of elongated members and the displaceable orifice member 156.

Figure 26:
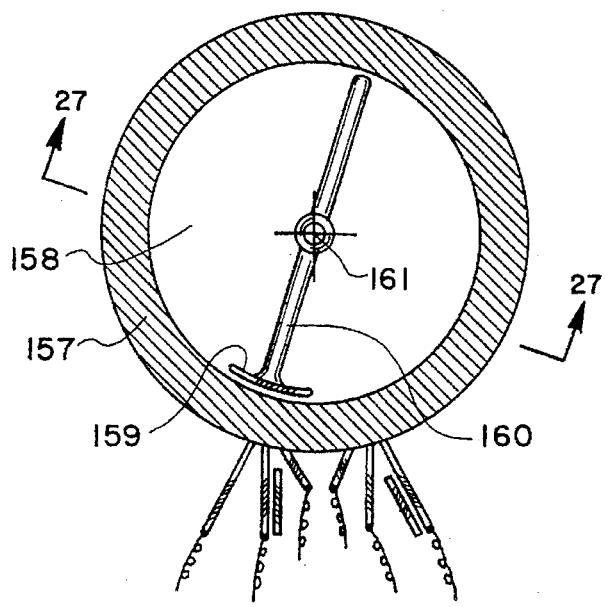
FIG. 26 illustrates a cross section of an embodiment of the nonrotating propeller flowmeter employing the rotary position sensor comprising three pairs of electrically conducting elongated members.

In FIG. 26 there is illustrated a cross section of an embodiment of the nonrotating propeller or nonrotating turbine flowmeter having a construction similar to and the same operating principles as those of the nonrotating propeller shown in FIG. 9. While the nonrotating propeller flowmeter shown in FIG. 9 employs a rotary position sensor comprising a single pair of elongated members, the nonrotating propeller flowmeter shown in the particular illustrative embodiment employs a rotary position sensor comprising three pairs of elongated members built into the wall 157 of the flow passage 158 having a circular cylindrical cross section, which rotary position sensor has the same construction as that of the rotary position sensor shown in FIG. 19. The capacitively coupling member 159 is affixed to the tip of one propeller blade 160 disposed rotatably about the center line 161 of the flow passage 158, wherein a torsion spring provides a bias torque countering the fluid dynamic torque exerted on the propeller by the fluid media moving through the flow passage 158.

Figure 27:
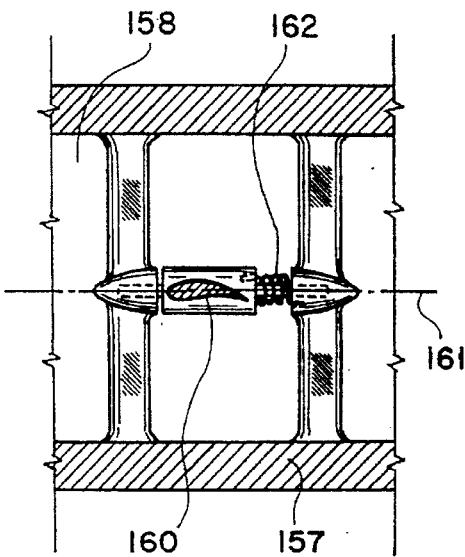
FIG. 27 illustrates another cross section of the nonrotating propeller flowmeter shown in FIG. 26.

In FIG. 27 there is illustrated another cross section of the nonrotating propeller flowmeter shown in FIG. 26, which cross section taken along plane 27—27 as shown in FIG. 26 illustrates the structural arrangement including the propeller blade 160 and the torsion spring 162. The cross section of the propeller blade 160 has an airfoil geometry having zero or a small constant angle of attack over the entire length of the propeller blade 160. As the propeller is not rotating, the pitch angle of the propeller is not varied from a large value at the root of the propeller to a small value at the tip thereof. The zero rotary position of the propeller corresponding zero flow of the fluid media may include a stop preventing the propeller from experiencing a rotary displacement beyond the zero rotary position in a direction opposite to the direction of the fluid dynamic torque exerted by the moving fluid media. The flow rate of the fluid media is determined as a function of the rotary position of the propeller blade 160 measured by means of the rotary position sensor included in the wall 157 of the flow passage 158. It is readily recognized that the level sensors, variable area flowmeters and nonrotating propeller flowmeters shown and described as a few representative applications of the position sensor taught by the present invention may employ a position sensor comprising a single, or a pair of, or three pairs of elongated members.

Figure 28:
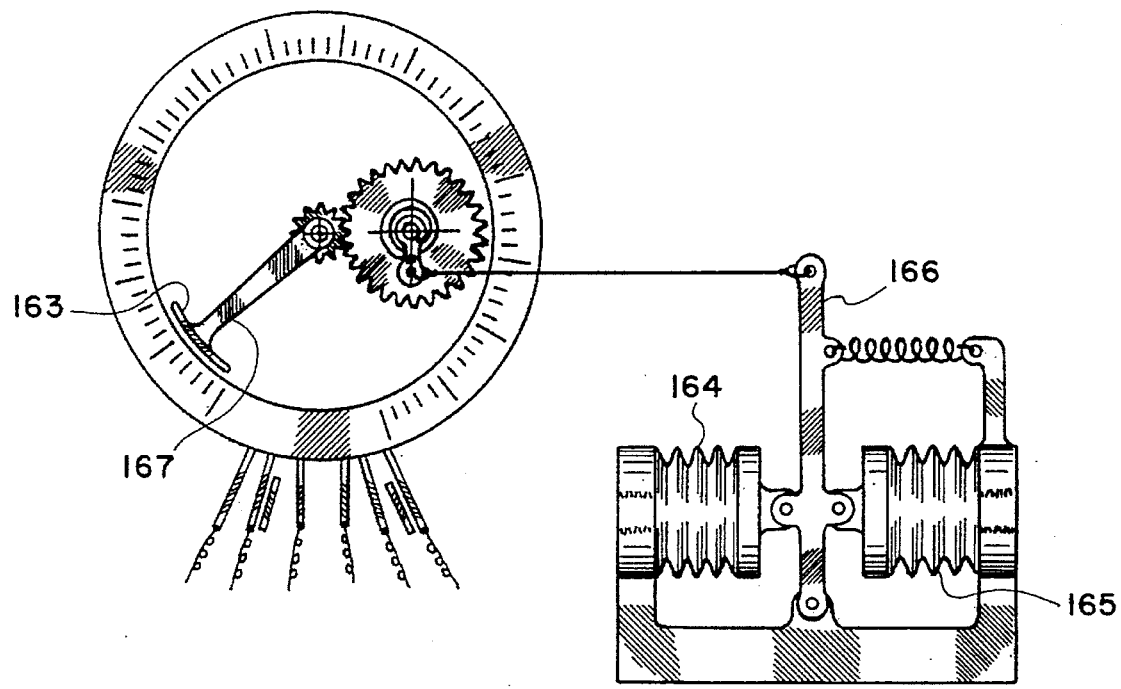
FIG. 28 illustrates an embodiment of the pressure sensor employing the rotary position sensor comprising three pairs of electrically conducting elongated members.

In FIG. 28 there is illustrated an embodiment of the pressure sensor employing a rotary position sensor comprising three pairs of elongated members such as the rotary position sensor shown in FIG. 19. The capacitively coupling member 163 corresponds to the capacitively coupling member 131 included in the rotary position sensor shown in FIG. 19. The difference between two pressures respectively introduced into two bellows 164 and 165 creates a pivoting displacement of the lever arm 166 that, in turn, rotates the arm or pointer 167 of the dial gauge. It is readily recognized that the rotary position sensor included in the particular illustrative embodiment of the pressure sensor with the electronic read-out device can be replaced with a rotary position sensor comprising a pair of elongated members such as that shown in FIG. 6 or 8, or with a rotary position sensor comprising a single elongated member such as that shown in FIG. 15 or 16. It should be understood that various types of the conventional visual read out displays such as the dial gauges and bar scales can be converted to an electronic read-out device by incorporating the position sensor of the present invention as exemplified by the case of the pressure shown in FIG. 28, wherein a position sensor comprising a single, or a pair of, or three pairs of elongated members may be employed to electrically and automatically measure the linear or rotary position of the pointer or indicator representing the value of a physical quantity under measurement.

The three different structural embodiment of the position sensor of the position sensor shown and described in conjunction with FIGS. 1 through 28 can be summarized as follows: The first structural embodiment of the position sensor comprising a single elongated member is illustrated in FIGS. 14 through 16, wherein the alternating electrical signal is conductively supplied to the capacitively coupling member and the phase angle difference between two alternating electrical signals respectively taken off from the two opposite extremities of the single elongated member is measured, and the position of the capacitively coupling member is determined as a function of the measured phase angle difference. In a modified version, the alternating electrical signal can be supplied to one of the two opposite extremities of the single elongated member and the phase angle difference between two alternating electrical signals respectively taken off from the capacitively coupling member and the other of the two opposite extremities of the single elongated member can be measured to determine the position of the capacitively coupling member. The second structural embodiment of the position sensor comprising a pair of elongated members is illustrated in FIGS. 1 through 8, wherein the alternating electrical signal is supplied to at least one of the two opposite extremities of the first of the pair of elongated members and the phase angle difference between two alternating electrical signals respectively taken off from the two opposite extremities of the second of the pair of elongated members. The position sensor works best when the alternating electrical signal is supplied to both of the two opposite extremities of the first of the pair of elongated members. When the alternating electrical signal is supplied to only one of the two opposite extremities of the first of the pair of elongated members, the other of the two opposite extremities of the first of the pair of elongated members may be grounded. In a modified version, the alternating electrical signal is supplied to one of the two opposite extremities of the first of the pair of elongated members and the phase angle difference between two alternating electrical signals respectively taken off from one of the two opposite extremities of the first of the pair of elongated members and one of the two opposite extremities of the second of the pair of elongated members. This version of the position sensor works best when the two alternating electrical signals are respectively taken off from the same extremity of the first of the pair of elongated members, to which extremity the alternating electrical signal is supplied, and one extremity of the second of the pair of elongated members, which one extremity is located on the same side of the capacitively coupling member as the extremity of the the first of the pair of elongated members receiving the alternating electrical signal. The third structural embodiment of the position sensor is illustrated in FIGS. 17 through 22, wherein the position sensor comprises three individual position sensors respectively comprising a single or a pair of elongated members, wherein each of the three individual position sensors has the same construction and the mode of operation as that defined by the afore-mentioned first or second structural embodiment of the position sensor. The first of the three individual position sensor has a first capacitively coupling member displaceable or movable following the length of the first individual position sensor, while the second and third individual position sensor respectively have a second and third capacitively coupling members fixedly disposed at two opposite extremities of the combination of the three individual position sensors, respectively. The position of the first capacitively coupling member is determined as a function of the three phase angle differences respectively provided by the three individual position sensors. It should be understood that, in the actual practice of the invention, the phase angle difference or other electrical variable representing the phase angle difference such as the tangent or cotangent of the phase angle difference can be measured by using an appropriate electronic measuring device, and then the position of the target member can be determined as a function of the phase angle difference or other electrical variable representing the phase angle difference by using an empirically obtained mathematical relationship. It is imperative to enclose the assembly of the electrically functioning components of the position sensor within a grounded electromagnetically shielding enclosure and use electromagnetically shielded lead wires in supplying the alternating electrical signal and taking off the alternating electrical signals providing the phase angle difference.

While the principles of the inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the invention without departing from those principles. It is not desired to limit the inventions to the particular illustrative embodiments shown and described and accordingly, all suitable modifications and equivalents may be regarded as falling within the scope of the inventions as defined by the claims which follow.

The embodiments of the inventions, in which an exclusive property or privilege is claimed, are defined as follows:

1. An apparatus for measuring position of a target member comprising in combination:
   a) an elongated cylindrical member including at least one of the following two surfaces; an external cylindrical surface of a constant cross sectional geometry wherein the elongated cylindrical member may have only the external cylindrical surface, and an internal cylindrical surface of a constant cross sectional geometry wherein the elongated cylindrical member has a hollow construction;
   b) a first electrically conducting elongated member having a finite value of ohmic resistance per unit length thereof and a sizable surface area disposed parallel to the central axis of the elongated cylindrical member in a relationship wherein the sizable surface area of the first electrically conducting elongated member is disposed adjacent to one of the external and internal cylindrical surfaces of the elongated cylindrical member;
   c) a second electrically conducting elongated member having a finite value of ohmic resistance per unit length thereof and a sizable surface area disposed parallel to the central axis of the elongated cylindrical member and parallel to the first electrically conducting elongated member in a relationship wherein the sizable surface area of the second electrically conducting elongated member is disposed adjacent to said one of the external and internal cylindrical surfaces of the elongated cylindrical member;
   d) a capacitively coupling member having a sizable surface area disposed in a sliding relationship following the central axis of the elongated cylindrical member in a relationship wherein the sizable surface area of the capacitively coupling member maintains a close surface-to-surface proximity relationship with a portion of the sizable surface area of the first electrically conducting elongated member and with a portion of the sizable surface area of the second electrically conducting elongated member in an electrically nonconducting relationship at all instants during sliding movement of the capacitively coupling member relative to the first and second electrically conducting elongated members;
   e) means for supplying an input alternating electrical signal to the first electrically conducting elongated member;
   f) means for taking off two output alternating electrical signals respectively from two opposite extremities of the second electrically conducting elongated member; and
   g) means for obtaining an electrical variable related to a phase angle difference between the two output alternating electrical signals as a measure of position of the capacitively coupling member relative to at least one of two extremities of the elongated cylindrical member.

2. An apparatus as defined in claim 1 wherein said combination includes means for determining position of the capacitively coupling member as a function of the electrical variable related to the phase angle difference.

3. An apparatus as defined in claim 1 wherein the combination of the first and second electrically conducting elongated members and the capacitively coupling member is surrounded by a grounded enclosure providing an electromagnetic shielding from ambient surroundings.

4. An apparatus as defined in claim 1 wherein the first and second electrically conducting elongated members are disposed adjacent to the external cylindrical surface of the elongated cylindrical member, and the capacitively coupling member is disposed adjacent to a cylindrical surface of a hole disposed through a target member; wherein the hole included in the target member engages the elongated cylindrical member in a close tolerance sliding relationship.

5. An apparatus as defined in claim 4 wherein the combination includes means for determining position of the target member as a function of the electrical variable related to the phase angle difference.

6. An apparatus as defined in claim 4 wherein the combination of the elongated cylindrical member and the target member is surrounded by a grounded enclosure providing an electromagnetic shielding from ambient surroundings.

7. An apparatus as defined in claim 4 wherein the first and second electrically conducting elongated members are disposed respectively adjacent to two diametrically opposite sides of the external cylindrical surface of the elongated cylindrical member, and the capacitively coupling member has geometry of a cylindrical shell conforming to geometry of cylindrical wall of the hole included in the target member.

8. An apparatus as defined in claim 7 wherein the combination includes means for determining position of the target member as a function of the electrical variable related to the phase angle difference.

9. An apparatus as defined in claim 7 wherein the combination of the elongated cylindrical member and the target member is surrounded by a grounded enclosure providing an electromagnetic shielding from ambient surroundings.

10. An apparatus as defined in claim 4 wherein the target member is a float floating at a free surface of a liquid medium.

11. An apparatus as defined in claim 1 wherein the elongated cylindrical member has structure of elongated hollow shell, the first and second electrically conducting elongated members are disposed adjacent to the internal cylindrical surface of the elongated cylindrical member, and the capacitively coupling member is disposed adjacent to an external cylindrical surface of a target member engaging the internal cylindrical surface of the elongated cylindrical member in a close tolerance sliding relationship.

12. An apparatus as defined in claim 11 wherein the combination includes means for determining position of the target member as a function of the electrical member variable related to the phase angle difference.

13. An apparatus as defined in claim 11 wherein the external cylindrical surface of the elongated cylindrical member is covered with a grounded electrically conducting lining providing an electromagnetic shielding from ambient surroundings.

14. An apparatus as defined in claim 11 wherein the first and second electrically conducting, elongated members are disposed respectively adjacent to two diametrically opposite sides of the internal cylindrical surface of the elongated cylindrical member, and the capacitively coupling member has geometry of a cylindrical shell conforming to geometry of the external cylindrical surface of the target member.

15. An apparatus as defined in claim 14 wherein the combination includes means for determining position of the target member as a function of the electrical variable related to the phase angle difference.

16. An apparatus as defined in claim 14 wherein the external cylindrical surface of the elongated cylindrical member is covered with a grounded electrically conducting lining providing an electromagnetic shielding from ambient surroundings.

17. An apparatus as defined in claim 11 wherein the target member is a float floating at a free surface of a liquid medium.

18. An apparatus as defined in claim 11 wherein the target member has a centrally located opening disposed coaxially to the central axis of an elongated hole defined by the internal cylindrical surface of the elongated cylindrical member, and the elongated hole included in the elongated cylindrical member has a tapered solid core disposed coaxially to the elongated hole and extending through the opening centrally disposed through the target member in a freely sliding relationship wherein a ring-shaped gap between the tapered solid core and the cylindrical wall of the opening included in the target member progressively increases from a minimum value at one extremity of the tapered solid core to a maximum value at the other extremity of the tapered solid core opposite to said one extremity; wherein space between the tapered solid core and the cylindrical wall of the elongated hole included in the elongated cylindrical member provides a flow passage for fluid media, and the target includes bias force means counteracting fluid dynamic drag force exerted by fluid media moving through the flow passage in a direction from minimum cross sectional area of the flow passage to maximum cross sectional area of the flow passage.

19. An apparatus as defined in claim 18 wherein the combination includes means for determining flow rate of fluid media moving through the flow passage as a function of the electrical variable related to the phase angle difference.

20. An apparatus as defined in claim 18 wherein the external cylindrical surface of the elongated cylindrical member is encased within a grounded metallic sleeve providing an electromagnetic shielding from ambient surroundings.

* * * * *